(No Model.)

J. J. EASTMAN.
MEASURING BOTTLE STOPPER.

No. 258,035. Patented May 16, 1882.

Witnesses:
W. L. Langley.
Harry V. Albaugh.

Inventor:
John J. Eastman,
by G. H. H. Howard
Attys.

UNITED STATES PATENT OFFICE.

JOHN J. EASTMAN, OF MEDIA, PENNSYLVANIA, ASSIGNOR TO WILMER L. KELLER, OF BALTIMORE, MARYLAND.

MEASURING BOTTLE-STOPPER.

SPECIFICATION forming part of Letters Patent No. 258,035, dated May 16, 1882.

Application filed April 15, 1881. (No model.)

*To all whom it may concern:*

Be it known that I, JOHN J. EASTMAN, of Media, in the county of Delaware and State of Pennsylvania, have invented certain Improvements in Measuring Bottle-Stoppers, of which the following is a specification.

This invention relates to certain improvements in that class of measuring bottle-stoppers in which a complete measuring-vessel is combined with an ordinary bottle-stopper, the two devices being either in one solid piece or made separately and united.

It is found in the use of a measuring bottle-stopper constructed as above briefly described that liquid finding its way to the exterior of the measure in the careless handling of the device passes down the stopper to the base or handle thereof when the measure is held in an upright position. To obviate this difficulty I provide the inner end of the stopper, near to the base of the measure, with an annular depression, into which liquid running down the exterior of the measure, as before stated, is conducted.

Figure 1:
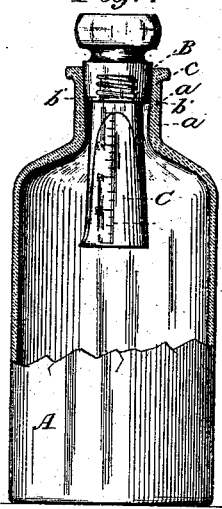
Figure 2:
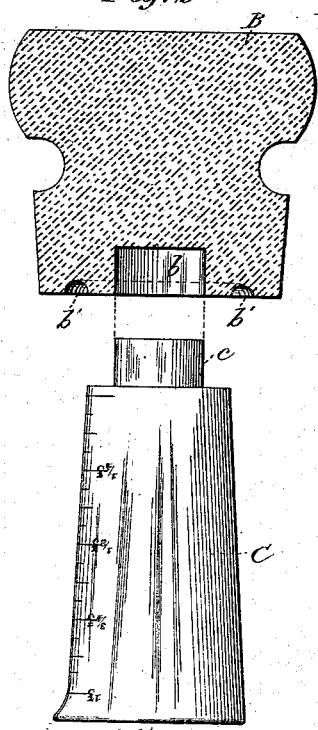
Figure 3:
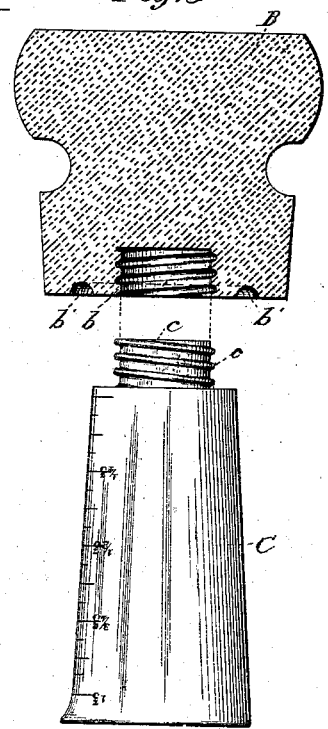

In the accompanying drawings, forming a part hereof, Figure 1 is a partly-sectional view of a bottle fitted with my improved measuring bottle-stopper. Figs. 2 and 3 are views of the stopper and measure separated and on an enlarged scale, and illustrating two methods of effecting the union of the said parts of the device when the same are not formed in a single solid piece.

Similar letters of reference indicate similar parts in all the views.

In the said drawings, A represents the body of the bottle, and *a* the neck thereof. B is the stopper, and C the measuring-vessel. The cavity in the stopper, into which the projection *c* is inserted, is marked *b*, and the annular depression around the cavity *b'*. In Figs. 1 and 3 the stopper and measure are held together by means of threads, while in Fig. 2 the contact-surfaces of the two devices are plain and the union completed by means of cement. I make no claim, however, to the construction of the complete device in two parts, or to any particular method of securing the said parts together; but What I do claim as my invention is—

A bottle-stopper having at its inner or lower end a measuring-extension and an annular groove surrounding the base of the said extension, substantially as and for the purpose specified.

JOHN J. EASTMAN.

Witnesses:
ROBT. C. EASTMAN,
ALFRED W. MONTAGUE.